US009189218B2

(12) United States Patent
Pongrácz et al.

(10) Patent No.: US 9,189,218 B2
(45) Date of Patent: Nov. 17, 2015

(54) PROCESSING PACKETS BY GENERATING MACHINE CODE FROM PRE-COMPILED CODE FRAGMENTS

(71) Applicant: Telefonaktiebolaget L M Ericsson (publ), Stockholm (SE)

(72) Inventors: Gergely Pongrácz, Budapest (HU); Zoltán Lajos Kis, Budapest (HU); László Molnár, Budapest (HU)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 64 days.

(21) Appl. No.: 14/225,555

(22) Filed: Mar. 26, 2014

(65) Prior Publication Data
US 2015/0277882 A1 Oct. 1, 2015

(51) Int. Cl.
*G06F 9/44* (2006.01)
*G06F 9/445* (2006.01)
*H04L 12/721* (2013.01)
*H04L 12/26* (2006.01)
*H04L 12/24* (2006.01)

(52) U.S. Cl.
CPC .............. *G06F 8/54* (2013.01); *H04L 41/0816* (2013.01); *H04L 43/0882* (2013.01); *H04L 43/16* (2013.01); *H04L 45/38* (2013.01)

(58) Field of Classification Search
USPC ........................................................ 717/167
See application file for complete search history.

(56) References Cited

U.S. PATENT DOCUMENTS

| | | | | | |
|---|---|---|---|---|---|
| 4,791,566 | A | * | 12/1988 | Sudama | H04L 29/00 709/227 |
| 6,111,877 | A | * | 8/2000 | Wilford | H04L 29/06 370/238 |
| 6,598,034 | B1 | | 7/2003 | Kloth | |
| 7,930,691 | B2 | * | 4/2011 | Bhattacharya | G06F 8/67 717/168 |
| 2003/0043855 | A1 | * | 3/2003 | Yamamoto | H04J 14/0227 370/503 |
| 2003/0067878 | A1 | * | 4/2003 | Zboril | H04L 12/5602 370/235 |
| 2003/0229839 | A1 | * | 12/2003 | Wang | H04L 1/004 714/776 |
| 2005/0111460 | A1 | * | 5/2005 | Sahita | 370/395.3 |
| 2010/0054151 | A1 | * | 3/2010 | Droz et al. | 370/253 |

(Continued)

OTHER PUBLICATIONS

Monsanto, Christopher, "A Compiler and Run-time System for Network Programming Languages", Proceedings of the 2009 ACM Sigplan conference on programming language design and implementation, Jan. 25, 2012, pp. 217-230, vol. 47, No. 1, Philadelphia, PA. XP058007080.

*Primary Examiner* — Marina Lee
(74) *Attorney, Agent, or Firm* — Coats & Bennett, PLLC

(57) ABSTRACT

A packet switching device can process packets by linking pre-compiled code fragments corresponding to actions to be performed for a packet flow, in order to generate a flow function. Once generated, the packet switching device can invoke this flow function for one or more packets in the packet flow. For example, a linker could use a flow table to determine the actions to be performed for a packet flow. Those actions may correspond to code fragments which have already been compiled and make use of symbols as placeholders for parameters yet to be defined. To generate a flow function, the pre-compiled code fragments corresponding to the actions of a flow can be sequenced and linked together. The parameter values of the actions can then replace the placeholder symbols. Once fully assembled, the flow function can be written to memory and executed any time a packet for the corresponding flow needs to be routed.

20 Claims, 8 Drawing Sheets

(56) References Cited

U.S. PATENT DOCUMENTS

| | | | | |
|---|---|---|---|---|
| 2010/0085891 A1* | 4/2010 | Kind | ............ | H04L 43/026 370/253 |
| 2010/0293535 A1* | 11/2010 | Andrade | ............ | G06F 8/44 717/156 |
| 2011/0310734 A1* | 12/2011 | Mizukoshi | ............ | H04L 45/42 370/231 |
| 2013/0100849 A1* | 4/2013 | Szabo et al. | ............ | 370/253 |
| 2013/0235868 A1 | 9/2013 | Owens et al. | | |
| 2014/0211795 A1* | 7/2014 | Chiba | ............ | H04L 49/25 370/389 |

* cited by examiner

PROCESSING PACKETS BY GENERATING MACHINE CODE FROM PRE-COMPILED CODE FRAGMENTS

TECHNICAL FIELD

The present disclosure relates generally to processing packets in a communications network.

BACKGROUND

Modern communications networks enable computing devices to communicate with each other, even when not directly communicatively coupled to each other. This is enabled by message-forwarding devices, e.g., routers, which are responsible for accepting messages originating from a source, and forwarding them towards a final destination. By networking numerous message-forwarding devices together, highly complex networks, such as the Internet, are possible.

In a complex network, such as the Internet, it can be computationally expensive for a router, for example, to determine how to forward a message. For example, a message may be a data unit known as a packet. If the network is a packet-switched network, each packet received by a router is permitted to take a different route to a given destination. Thus a router may potentially consider numerous factors for every packet that is received, such as present network conditions, quality of service policies, and so on. Because of the high volume of packets handled by modern routers, even small inefficiencies can accumulate to cause significant performance problems. Thus, methods and systems that can produce even small gains in efficiency are highly desirable.

SUMMARY

In exemplary embodiments of the present disclosure, a packet switching device can process packets by linking pre-compiled code fragments corresponding to actions to be performed for a packet flow, in order to generate a flow function. Once generated, the packet switching device can invoke this flow function for one or more packets in the packet flow. For example, a linker could use a flow table to determine the actions to be performed for a packet flow. Those actions may correspond to code fragments which have already been compiled and make use of symbols as placeholders for parameters yet to be defined. To generate a flow function, the pre-compiled code fragments corresponding to the actions of a flow can be sequenced and linked together. The parameter values of the actions can then replace the placeholder symbols. Once fully assembled, the flow function can be written to memory and executed any time a packet for the corresponding flow needs to be routed.

Exemplary embodiments of the disclosure comprise methods of routing packets, implemented in a network packet switching device. In one exemplary embodiment, the packet switching device determines one or more actions to be performed for a packet flow. The packet switching device then links pre-compiled code fragments corresponding to at least two of the one or more actions to generate a flow function for the packet flow. The packet switching device also replaces symbols in the pre-compiled code fragments with values corresponding to the one or more actions and invokes the flow function for one or more packets in the packet flow.

In some embodiments, linking pre-compiled code fragments is performed in response to updating the one or more actions.

In some embodiments, the method further comprises incrementing a flow counter each time the packet flow is executed, and linking pre-compiled code fragments in response to the flow counter reaching a threshold.

In some embodiments, linking pre-complied code fragments comprises linking pre-complied code fragments corresponding to fewer than all of the actions, and invoking the actions not having corresponding pre-compiled code fragments for the one or more packets in the packet flow.

In some embodiments, linking pre-compiled code fragments comprises linking fewer pre-compiled code fragments than actions that the pre-compiled code fragments correspond to.

In some embodiments, determining one or more actions to be performed for the packet flow comprises referencing an entry in a flow table. In one embodiment, linking pre-compiled code fragments is performed in response to the entry being added to the flow table. In one embodiment, the method further comprises linking pre-compiled code fragments to generate a flow function for an entry of a second flow table.

In some embodiments, invoking the flow function for one or more packets in the packet flow comprises invoking the flow function for a packet in the packet flow that caused the flow function to be generated.

In some embodiments, linking pre-compiled code fragments is performed according to a probability in response to performing the one or more actions for the packet flow.

Other embodiments comprise a packet switching device that comprises an interface circuit for exchanging packets with a network, and a processing circuit operatively connected to the interface circuit. The processing circuit is configured to determine one or more actions to be performed for a packet flow, link pre-compiled code fragments corresponding to at least two of the one or more actions to generate a flow function for the packet flow, replace symbols in the pre-complied code fragments with values corresponding to the one or more actions, and invoke the flow function for one or more packets in the packet flow.

In some embodiments, the processing circuit is configured to link pre-compiled code fragments in response to updating the one or more actions.

In some embodiments, the processing circuit is further configured to increment a flow counter each time the packet flow is executed, and configured to link pre-compiled code fragments in response to the flow counter reaching a threshold.

In some embodiments, the processing circuit is configured to link pre-compiled code fragments by linking pre-compiled code fragments corresponding to fewer than all of the actions, and is further configured to invoke the actions not having corresponding pre-compiled code fragments for the one or more packets in the packet flow.

In some embodiments, the processing circuit is configured to link pre-compiled code fragments by linking fewer pre-compiled code fragments than actions that the pre-complied code fragments corresponding to.

In some embodiments, the processing circuit is configured to determine one or more actions to be performed for the packet flow by referencing an entry in a flow table. In one embodiment, the processing circuit is configured to link pre-compiled code fragments in response to the entry being added to the flow table. In one embodiment, the processing circuit is further configured to link pre-compiled code fragments to generate a flow function for an entry of a second flow table.

In some embodiments, the processing circuit is configured to invoke the flow function for one or more packets in the packet flow by invoking the flow function for a packet in the packet flow that caused the processing circuit to generate the flow function.

In some embodiments, the processing circuit is configured to link pre-complied code fragments according to a probability in response to performing the one or more actions for the packet flow.

Other embodiments comprise a packet switching device configured to determine one or more actions to be performed for a packet flow, link pre-compiled code fragments corresponding to at least two of the one or more actions to generate a flow function for the packet flow, replace symbols in the pre-complied code fragments with values corresponding to the one or more actions, and invoke the flow function for one or more packets in the packet flow.

In some embodiments, the packet switching device is configured to link pre-compiled code fragments in response to updating the one or more actions.

In some embodiments, the packet switching device is further configured to increment a flow counter each time the packet flow is executed, and configured to link pre-compiled code fragments in response to the flow counter reaching a threshold.

In some embodiments, the packet switching device is configured to link pre-compiled code fragments by linking pre-compiled code fragments corresponding to fewer than all of the actions, and is further configured to invoke the actions not having corresponding pre-compiled code fragments for the one or more packets in the packet flow.

In some embodiments, the packet switching device is configured to link pre-compiled code fragments by linking fewer pre-compiled code fragments than actions that the pre-complied code fragments corresponding to.

In some embodiments, the packet switching device is configured to determine one or more actions to be performed for the packet flow by referencing an entry in a flow table. In one embodiment, the packet switching device is configured to link pre-compiled code fragments in response to the entry being added to the flow table. In one embodiment, the packet switching device is further configured to link pre-compiled code fragments to generate a flow function for an entry of a second flow table.

In some embodiments, the packet switching device is configured to invoke the flow function for one or more packets in the packet flow by invoking the flow function for a packet in the packet flow that caused the network router to generate the flow function.

In some embodiments, the packet switching device is configured to link pre-complied code fragments according to a probability in response to performing the one or more actions for the packet flow.

DETAILED DESCRIPTION

Figure 1:
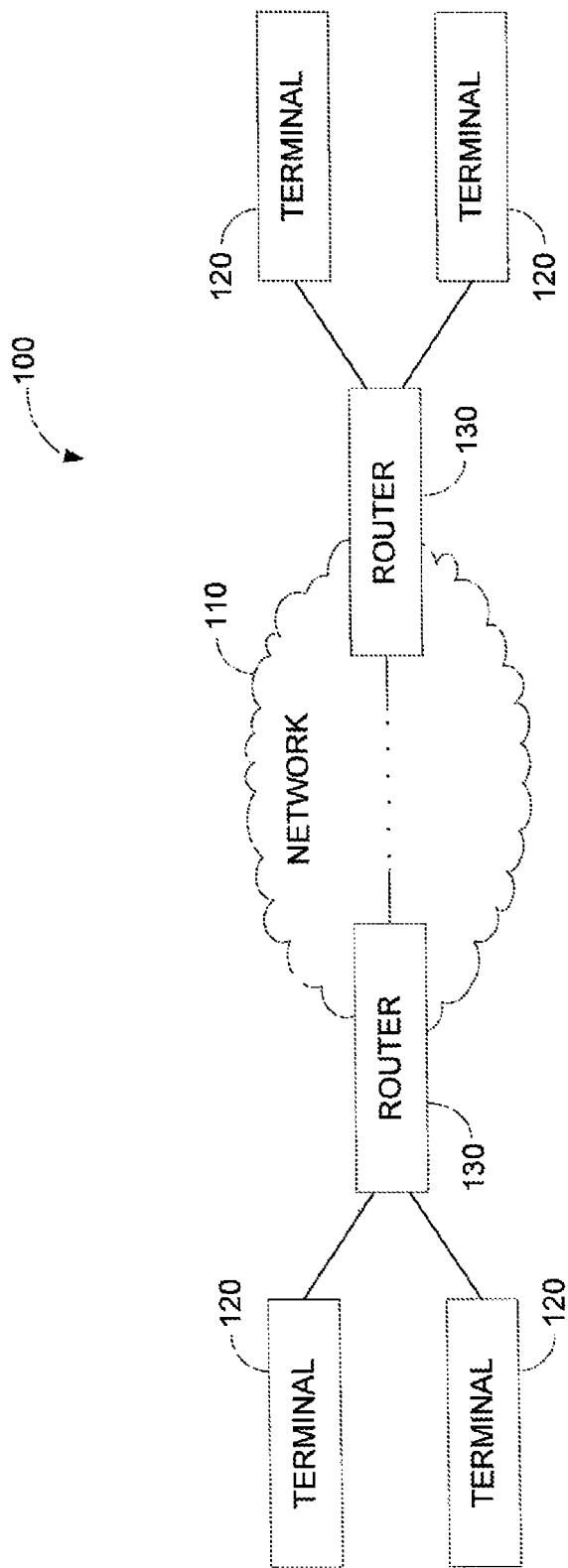
FIG. 1 illustrates an exemplary communication network in which terminals can exchange communication packets with each other via routers.

FIG. 1 illustrates an exemplary communication network 100 that allows terminals 120 to communicate with each other. The network 100 can be, for example, an IP-based packet-switched network, or a Multiprotocol Label Switching (MPLS) network. The network 100 can comprise one or more packet-switching devices 110, such as routers 130. Each router 130 is responsible for forwarding packets from a source towards a final destination. Although the present disclosure will be discussed in terms of routers, it will be well-understood by one of ordinary skill in the art how switches, hubs, gateways, and other packet-forwarding devices apply to the principles taught herein. Similarly, although the present disclosure will be discussed in terms of packets, it will be well-understood by one of ordinary skill in the art how cells, frames, datagrams, and other data units apply to the principles taught herein.

Each router 130 along the route of a packet must decide where to route the packet in order for the packet to ultimately arrive at the intended destination. These routing decisions can be computationally intensive, as numerous factors contribute to the decision-making process. Further, the number of packets being handled by any particular router can be massive. Thus, inefficiency in the processing of packets within a router 130 can very quickly consume all of the processing resources of the router, resulting in network congestion.

One method of simplifying the decision-making process for routing packets is to correlate packets for which similar routing decisions should be made. Packets correlated in this way can be deemed as belonging to a packet flow. For example, all packets having the same source and destination IP addresses could be considered part of the same flow. Other methods of organizing flows are also possible. By making routing decisions based on flows, rather than individual packets, fewer total decisions need to be made and packet processing efficiency increases.

Figure 2:
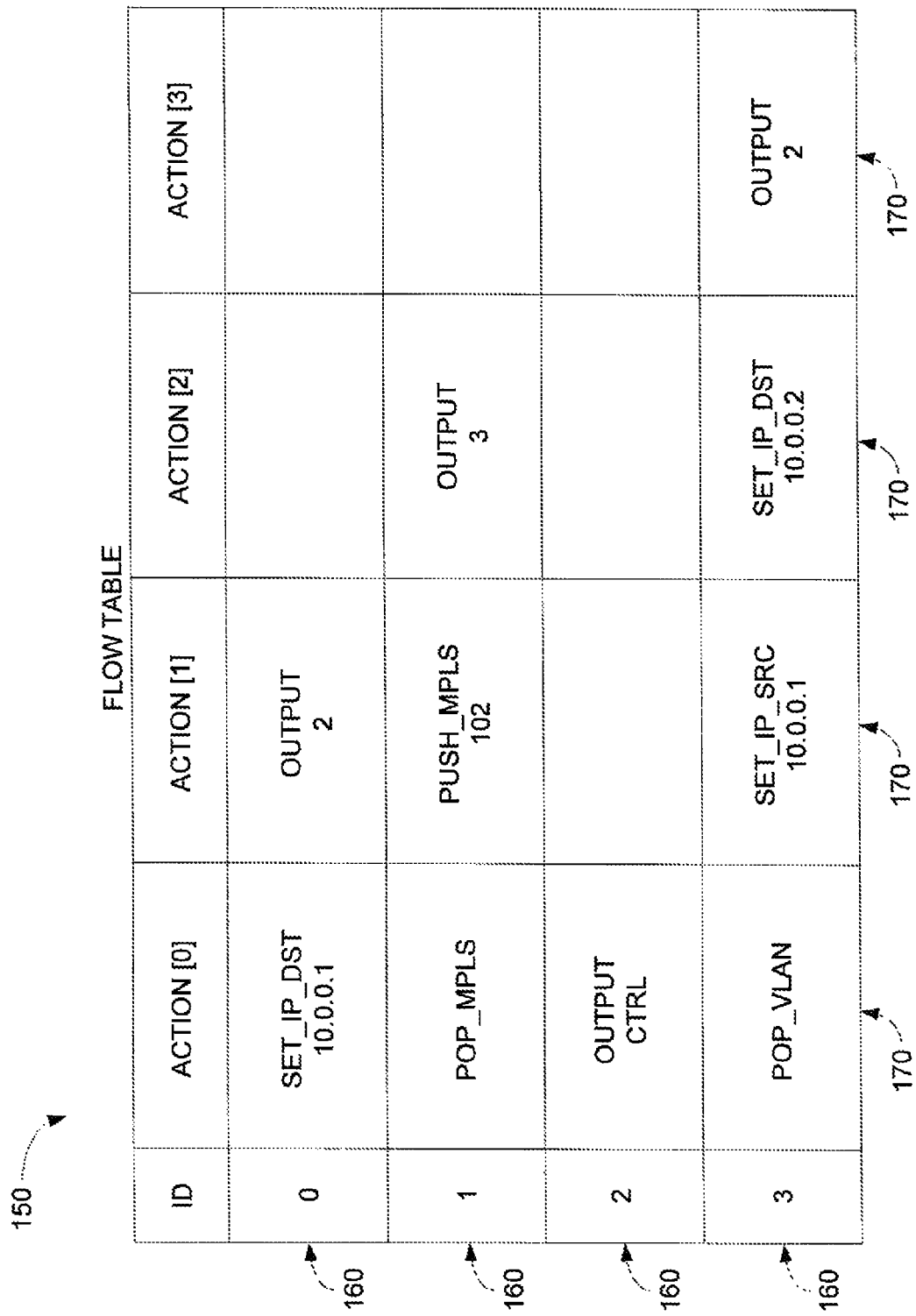
FIG. 2 illustrates an exemplary flow table.

A router 130 that performs flow-based processing can, for example, use a flow table 150 to track flows and organize the processing steps necessary to route packets belonging to that flow. FIG. 2 illustrates an example of such a flow table 150. By identifying the flow to which a packet belongs, as represented in the flow table 150 by a flow entry 160, a router 130 can retrieve the set of actions 170 necessary to successfully route that packet. Although a packet instigating a new flow may require the router 130 to perform a computationally expensive analysis to determine the appropriate routing actions 170, if those actions 170 are stored in a flow table 150, similar expensive processing for subsequent packets in the flow can be avoided. Each action 170 may indicate a command and some number of parameters for performing that command. For example, an action for routing a packet can include a command to set the destination IP address, as well as a parameter indicating what the destination IP address should be set to.

Figure 3:
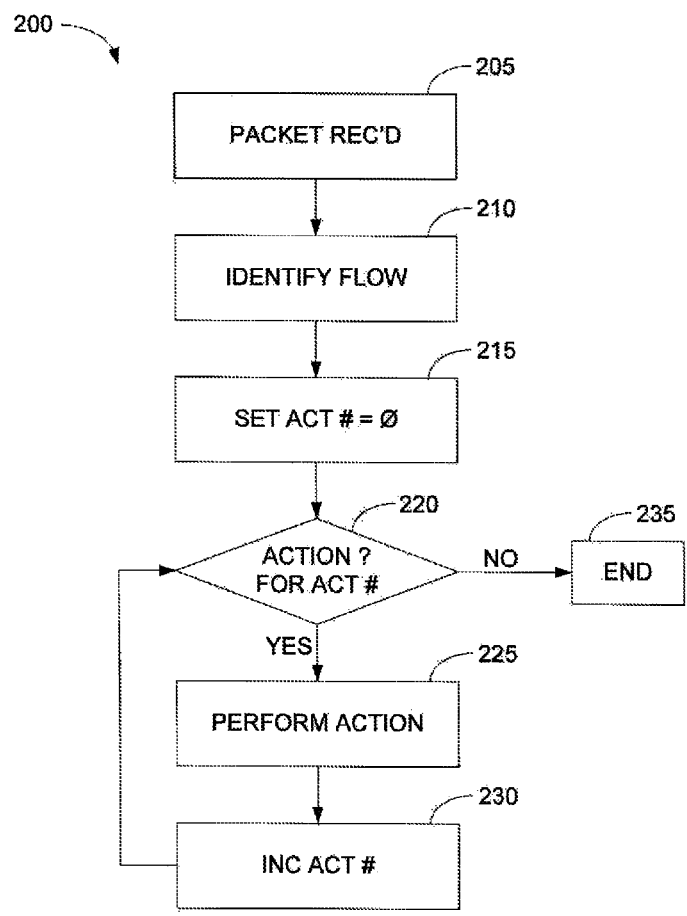
FIG. 3 illustrates an exemplary process for a router to process packets for routing according to a flow table.

FIG. 3 illustrates one possible method 200 for a router 130 to process packets for routing according to a flow table 150. When a packet is received (block 205), the router 130 can identify the flow to which the packet belongs (block 210). A processing counter can track the actions that have been performed for the packet, as those actions are performed. The processing counter can, for example, be initialized to zero (block 215) and incremented (block 230) each time an action is performed (block 225), until no further actions to be performed remain (block 220). Thus, if a packet to be routed is identified as belonging to flow 0, the corresponding first action 170 (i.e., action [0]) for flow 0 can be retrieved from the flow table 150 and executed. The processing counter can then be incremented, and the second action 170 for flow 0 can be retrieved and executed. However, upon incrementing the processing counter to 2, since there is action [2] for flow 0, the processing steps for the packet can be deemed completed (block 235).

Routers 130 implemented according to the OpenFlow protocol have been known to process packets for routing in a manner similar to that depicted in FIGS. 2 and 3. It has been observed, however, that processing in this way can result in a high amount of processing overhead. One cause of this processing overhead involves interpreting the command indicated by an action 170. Since the action 170 might involve any operation supported by the router 130, the router 130 must match the command indicated by the action 170 against a list of supported commands to find the right function to execute. The larger the command set supported by the router 130, the more expensive locating the appropriate function to execute will generally be. Further, since the flow table 150 can store numerous actions per flow 170, a packet routed according to a flow table 150 can suffer this lookup penalty numerous times per packet.

Another cause of this processing overhead involves the passing of action 170 parameters. Packets routed according to a flow table 150 may suffer a high number of memory reads and writes, as parameters must be extracted from flow table actions 170, passed as parameters to the executing function, then read from memory again by the executing function. Because these memory operations are performed for every parameter of every action 170 of every packet that is routed according to the flow table 150, even very small number of additional memory reads and writes can result in a very significant impact memory I/O penalty.

Figure 4:
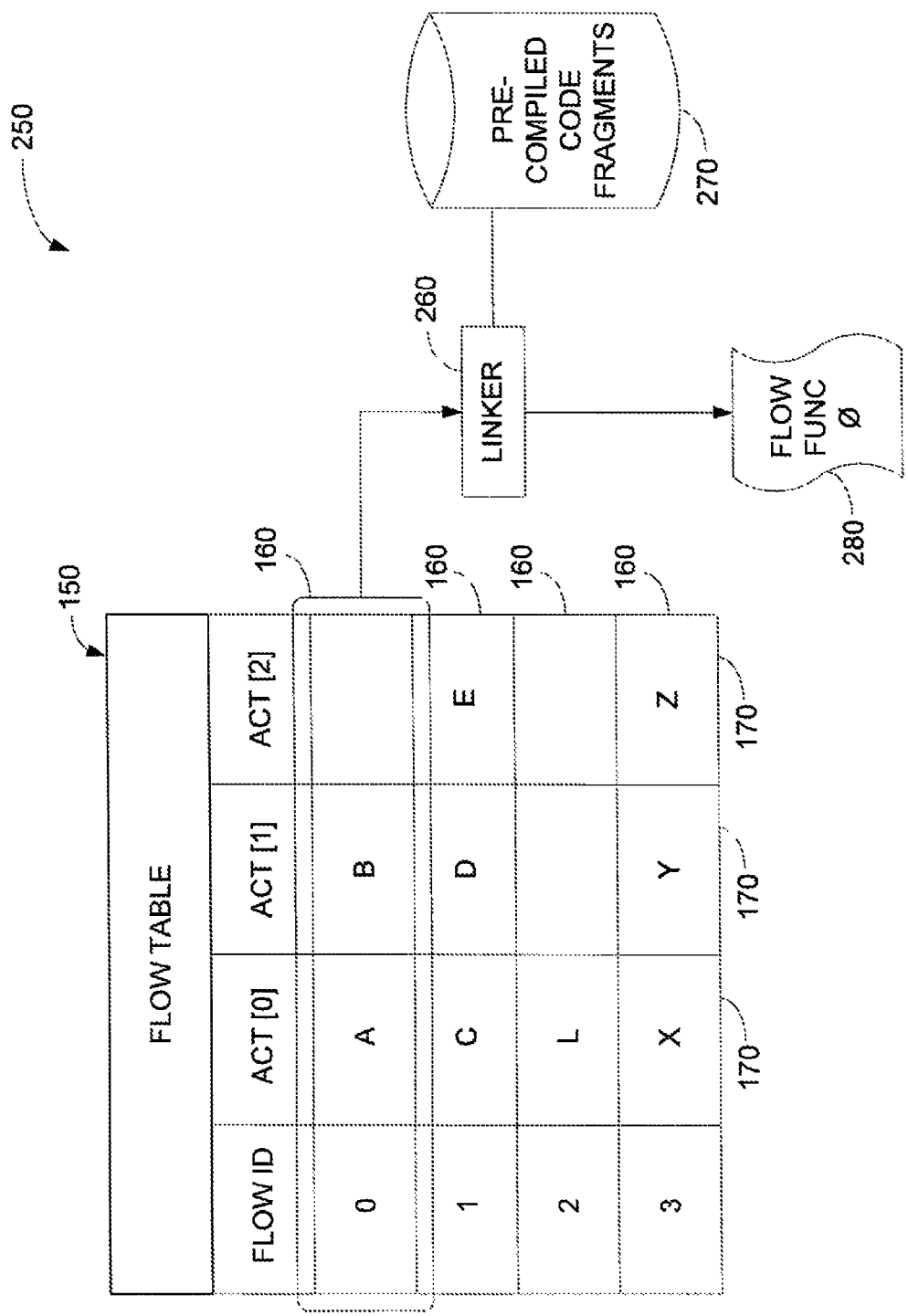
FIG. 4 illustrates using a flow table and pre-compiled code fragments to generate a flow function for the packet flow.

FIG. 4 illustrates a scheme 250 that avoids some of this processing overhead by linking pre-compiled code fragments 270 corresponding to actions 170 to be performed for a packet flow, in order to generate a flow function 280 for the packet flow. Once generated, the router 130 can then invoke the flow function 280 for one or more packets in the packet flow. For example, a linker 260 could use a flow table 150 to determine the one or more actions 170 to be performed for a packet flow. Those actions 170 may correspond to code fragments 270 which have already been compiled and use symbols as placeholders for parameters yet to be defined. To generate a flow function 280, the pre-compiled code fragments 270 that correspond to the actions 170 of a flow can be sequenced and linked together. The parameter values of the actions 170 can then replace the placeholder symbols. Once fully assembled, the flow function 280 can be written to memory and executed any time a packet for the corresponding flow needs to be routed. In this way, a single flow function 280 can be executed that does not involve the above-stated lookup and memory I/O penalties per action 170.

Figure 5:
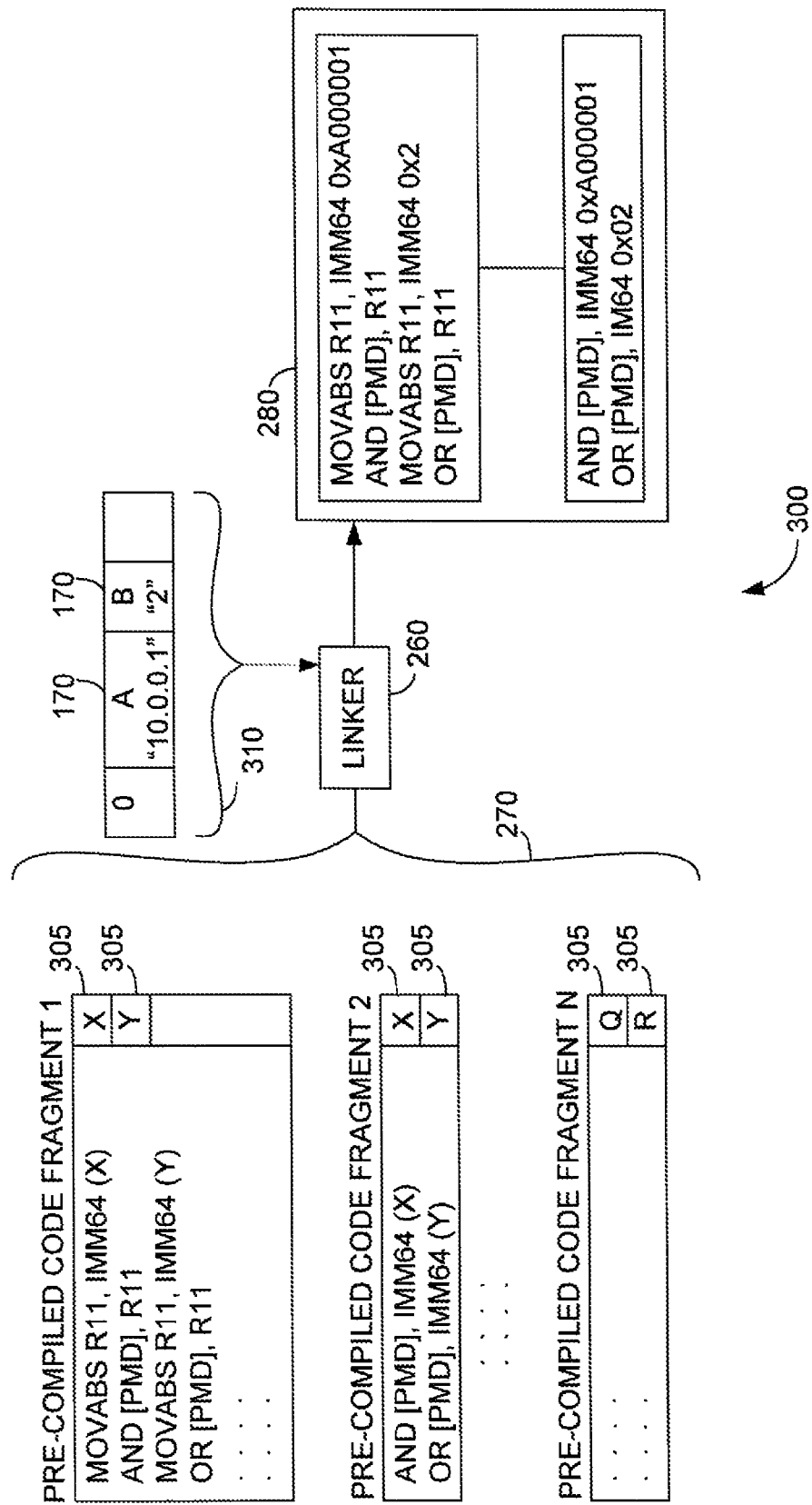
FIG. 5 illustrates an exemplary code construction process for generating a flow function.

FIG. 5 illustrates, in greater detail, the code construction process 300 for generating a flow function 280. A linker 260 can have a repository of pre-compiled code fragments 270 at its disposal. Each pre-compiled code fragment 270 can comprise machine code instructions that are executable by a processing circuit, and their corresponding parameters. Because these pre-compiled code fragments 270 are initially generic, symbols 305 can be used as placeholders for parameters that are not yet known. To generate a flow function 280, the router 130 can, for example, invoke the linker 260 for a specific entry 310 in the flow table 150. By this, or by other means, the actions 170 to be performed for a packet flow can be determined.

The linker 260 can then evaluate each action 170, and locate an appropriate pre-compiled code fragment 270 corresponding to that action. For example, the actions 170 may indicate to set the destination IP address to "10.0.0.1" and then output the packet on port "2." Accordingly, the linker 260 may find a pre-compiled code fragment that is useful for setting destination IP addresses, and another pre-compiled code fragment that is useful for outputting the packet on a port, and link these pre-compiled code fragments 270 to generate a flow function 280. The linker 260 may also use the parameter values "10.0.0.1" and "2" to replace the appropriate placeholder symbols 305 in the pre-compiled code fragments 270.

With particular reference to FIG. 5, flow table entry 0 has two actions 170, labelled A and B, for simplicity. The linker 260 can determine that pre-compiled code fragment 1 in the repository is useful for performing the functions indicated by A, and pre-compiled code fragment 2 in the repository is useful for performing the functions indicated by B. Accordingly, the linker 260 can make a copy of pre-compiled code fragments 1 and 2 and link them together. Constant value parameters from actions A and B can used to replace placeholder symbols 305 in the pre-compiled machine code, such that the machine code instructions of the flow function 280 are supplied with immediate data rather than references to memory. This creates a flow function 280 that the router 130 can invoke for one or more packets in the packet flow. Because the flow function 280 comprises the machine code instructions necessary to perform the corresponding actions 170, the aforementioned lookup penalties are avoided. Because the flow function 280 comprises immediate data values necessary to perform the corresponding actions 170, the aforementioned memory I/O penalties are avoided.

It is worth noting that there may be occasions in which an action 170 to be performed does not have a corresponding pre-compiled code fragment 270 in the router's repository. In such a case, generating the flow function 280 may involve linking pre-compiled code fragments 270 that correspond to fewer than all of the actions 170 to be performed for a packet flow. A flow function 280 generated in this way can still be invoked for one or more packets in the packets flow, and the router 130 may, under these circumstances, additionally invoke the actions 170 not having corresponding pre-compiled code fragments 270 for the same one or more packets.

In addition, the linker 260 may determine that two actions 170 correspond to a single pre-compiled code fragment 270. For example, if a first action 170 in a flow entry 160 indicates to pop a Multiprotocol Label Switching (MPLS) label off the label stack, and a second action 170 in the flow entry 160 indicates to push an MPLS label onto the label stack, these two actions 170 may correspond to a single pre-compiled code fragment 270 that is useful for replacing MPLS labels on the label stack. More generally, the linker 260 may determine that some number of actions 170 greater than two correspond to some number of pre-compiled code fragments 270 fewer than the number of actions 170. Thus, under such circumstances, the linker 260 may link fewer pre-compiled code fragments 270 than actions 170 corresponding to the pre-compiled code fragments 270. It is not necessary that there be a one-to-one correspondence between actions 170 and pre-compiled code fragments 270.

Figure 6:
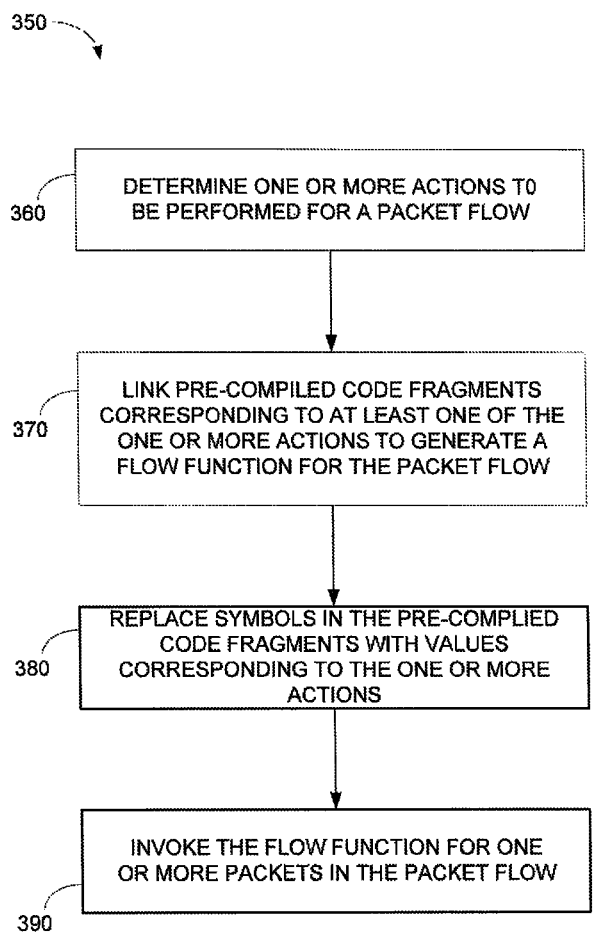
FIG. 6 illustrates an exemplary method of routing packets according to the present disclosure.

FIG. 6 illustrates one method 350 of routing packets according to the present disclosure. First, a router 130 can determine one or more actions 170 to be performed for a packet flow (block 360). Next, a router 130 can link pre-compiled code fragments 270 corresponding to at least two of the one or more actions 170 to generate a flow function 280 for the packet flow (block 370). Then, a router 130 can replace symbols in the pre-compiled code fragments 270 with values corresponding to the one or more actions 170 (block 380). Finally, the router 130 can invoke the flow function 280 for one or more packets in the packet flow (block 390).

Figure 7:
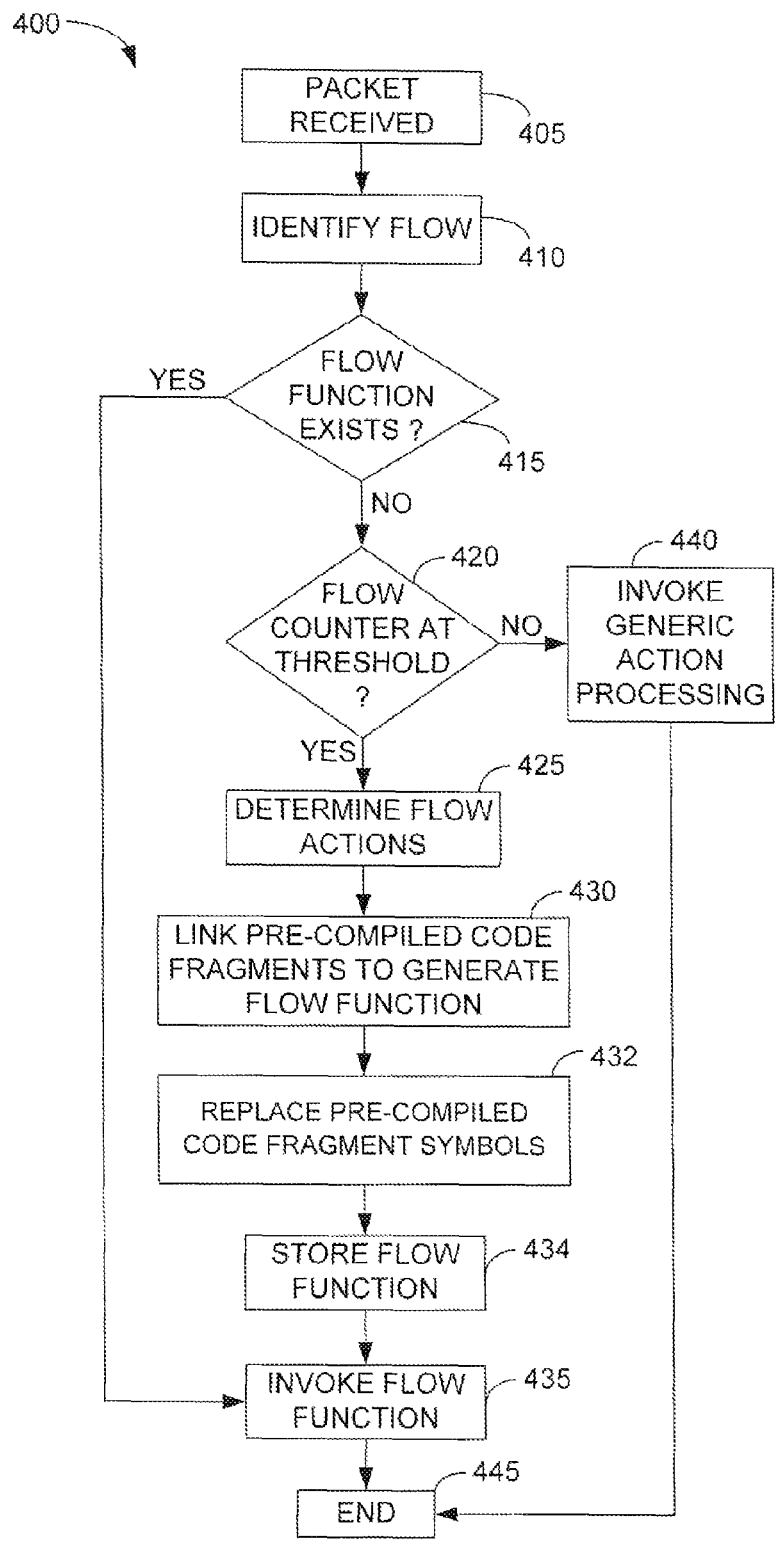
FIG. 7 illustrates a further exemplary method of routing packets according to the present disclosure.

FIG. 7 illustrates a more practical application 400 of the method of FIG. 6 according to the present disclosure. Upon receiving a packet (block 405), a router 130 can identify a packet flow for the packet (block 410). If there is a flow function 280 already generated for this flow (block 415), the router 130 can invoke this flow function 280 (block 435). If not, the router 130 may check whether a flow counter has reached a threshold (block 420). If not, the router 130 may decide to execute the actions 170 for the flow similar to the process described for FIG. 3 (block 440). If the flow counter has, however, reached the threshold, then the router 130 may proceed with generating a flow function 280 by determining one or more actions 170 to be performed for the packet flow (block 425), linking pre-compiled code fragments 270 corresponding to at least two of the one or more actions 170 (block 430), replacing symbols in the pre-compiled code fragments 270 with values corresponding to the one or more actions 170 (block 432) and storing the flow function 280 so that the flow function 280 can be executed (block 434). In one embodiment of the present disclosure, the received packet can be routed by invoking this flow function 280 (block 435). In another embodiment, the received packet can be routed according to the process described for FIG. 3, or using an existing flow function, while a new flow function is generated for use in routing a subsequent packet in the packet flow.

The flow counter discussed with regard to FIG. 7 serves to ensure that the one or more actions 170 to be performed for a packet flow are stable, and are likely to be reused. Because generating the flow function 280 requires processing resources, a process that generates a flow function 280 as soon as a new packet flow is identified may not be desirable. For example, such a flow function 280 generation scheme might be vulnerable to attack by sending it numerous single-packet flows. This could cause processor utilization of the router 130 to spike, and starve more stable flows of router 130 resources. By only creating a flow function 280 after a threshold number of times one or more actions 170 have been performed for a packet flow, the router 130 can be more certain that generating the flow function 280 is worth the computational expense.

On the other hand, certain routers 130 may benefit from immediately creating a flow function 280 upon detecting a new flow. For example, if a router 130 is serving a datacenter that only provides real-time rich content streaming, it may be very unlikely that there will ever be a packet flow with a very low number of packets. Alternatively, the router 130 could be a private router that is well enough protected from attack by other network safeguards that having an aggressive flow function 280 generation scheme may be worth any risk.

Other criteria instead of, or in addition to, a flow counter value reaching a threshold may be a triggering event, or pre-condition, to linking pre-compiled code fragments 270 to generate a flow function 280. For example, the linking pre-compiled code fragments 270 may be performed in response to updating the one or more actions 170 to be performed for the packet flow. This may be useful if, for example, a flow function 280 is generated for a packet flow, but the actions 170 for routing that packet flow no longer correspond to the same pre-compiled code fragments 270 used to generate that flow function 280. Thus, linking pre-compiled code fragments 270 in response to updating the one or more actions 170 to be performed for the packet flow may be a mechanism used to ensure that the flow function 280 stays current. This method could also be combined with the aforementioned flow counter, in order to ensure that the modification to the packet flow actions 170 is stable.

The linking pre-compiled code fragments 270 may also be performed in response to an entry 160 being added to a flow table 150. For example, if an entry 160 is added to the flow table 150 when a new packet flow is instigated, linking pre-compiled code fragments 270 in response to an entry 160 being added to the flow table 150 could be a way to ensure that each new packet flow causes a flow function 280 to be generated. Linking pre-compiled code fragments 270 in response to an entry 160 being added to the flow table 150 could also be a way to ensure that each entry 160 in the flow table 150 has a corresponding flow function 280.

A router 130 may also be implemented such that a first flow table 150 is maintained for routing according to one type of processing, while a second flow table 150 is maintained for a second type of processing. For example, the first flow table 150 may relate to processing packets for forwarding at the MAC layer. In contrast, the second flow table 150 may relate to processing packets for routing at the IP layer. A router 130 implemented with multiple flow tables 150 may link pre-compiled code fragments 270 for the flows indicated in the first table 150, and may separately link pre-compiled code fragments 270 for the flows indicated in the second table 150. This may be useful, for example, to efficiently handle routing tasks using flow functions 280 that are optimized for particular data communication protocols.

It is worth noting that there may be occasions in which an action 170 to be performed does not have a corresponding pre-compiled code fragment in the router's repository 270. In such a case, generating the flow function 280 may involve linking pre-compiled code fragments 270 that correspond to fewer than all of the actions 170 to be performed for a packet flow. A flow function 280 generated in this way can still be invoked for one or more packets in the packets flow, however, the router 130 may additionally invoke the actions 170 not having corresponding pre-compiled code fragments 270 for the same one or more packets.

Figure 8:
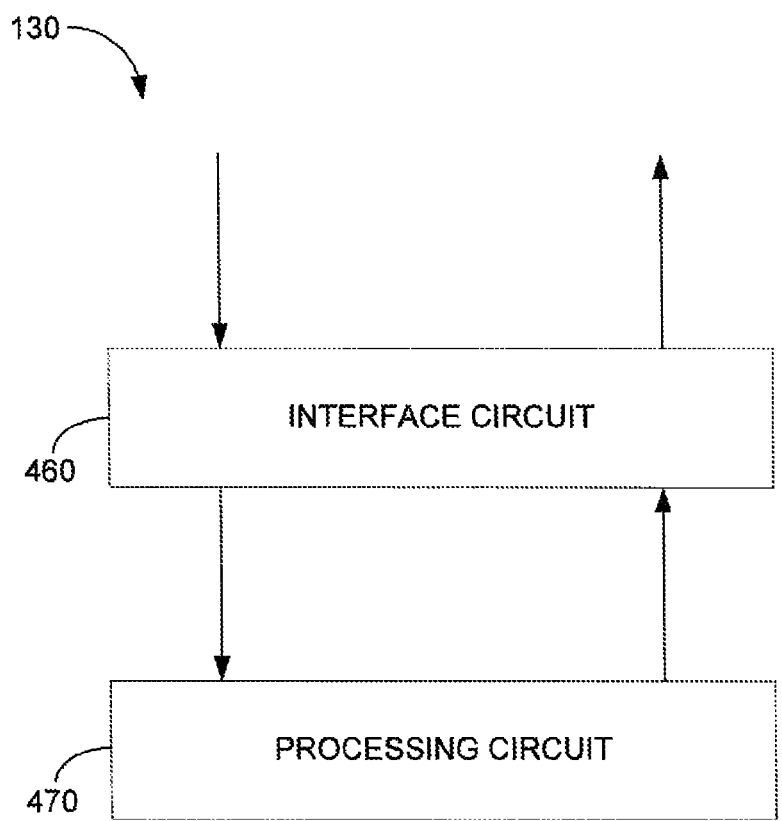
FIG. 8 illustrates an exemplary router useful for implementing the packet routing procedures described herein.

FIG. 8 illustrates an exemplary router 130 that may be used to implement the packet routing procedures described herein. The router 130 comprises an interface circuit 460 for exchanging packets with a network. The router 130 further comprises a processing circuit 470 operatively connected to the interface circuit 460. The processing circuit 470 is configured to determine one or more actions 170 to be performed for a packet flow, link pre-compiled code fragments 270 corresponding to at least one of the one or more actions 170 to generate a flow function 280 for the packet flow, and invoke the flow function 280 for one or more packets in the packet flow.

Those skilled in the art will appreciate that the various methods and processes described herein may be implemented using various hardware configurations that generally, but not necessarily, include the use of one or more microprocessors, microcontrollers, digital signal processors, or the like, coupled to memory storing software instructions or data for carrying out the techniques described herein. In particular, those skilled in the art will appreciate that the circuits of various embodiments of the router 130 may be configured in ways that vary in certain details from the broad descriptions given above. For instance, one or more of the processing functionalities discussed above may be implemented using dedicated hardware, rather than a microprocessor configured with program instructions. Such variations, and the engineering tradeoffs associated with each, will be readily appreciated by the skilled practitioner. Since the design and cost tradeoffs for the various hardware approaches, which may depend on system-level requirements that are outside the scope of the present disclosure, are well known to those of ordinary skill in the art, further details of specific hardware implementations are not provided herein.

In addition, the present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of processing packets, implemented in a packet switching device, the method comprising:
   determining one or more actions to be performed for a packet flow;
   linking pre-compiled code fragments corresponding to at least one of the one or more actions to generate a flow function for the packet flow;
   replacing symbols in the pre-compiled code fragments with values corresponding to the one or more actions;
   invoking the flow function for one or more packets in the packet flow.

2. The method of claim 1, wherein linking pre-compiled code fragments is performed in response to updating the one or more actions.

3. The method of claim 1, further comprising:
   incrementing a flow counter each time the packet flow is executed; and
   wherein linking pre-compiled code fragments is performed in response to the flow counter reaching a threshold.

4. The method of claim 1:
   wherein linking pre-compiled code fragments comprises linking pre-complied code fragments corresponding to fewer than all of the actions; and
   further comprising invoking the actions not having corresponding pre-compiled code fragments for the one or more packets in the packet flow.

5. The method of claim 1, wherein linking pre-compiled code fragments comprises linking fewer pre-compiled code fragments than actions that the pre-compiled code fragments correspond to.

6. The method of claim 1, wherein determining one or more actions to be performed for the packet flow comprises referencing an entry in a flow table.

7. The method of claim 6, wherein the linking pre-compiled code fragments is performed in response to the entry being added to the flow table.

8. The method of claim 6, further comprising linking pre-compiled code fragments to generate a flow function for an entry of a second flow table.

9. The method of claim 1, wherein invoking the flow function for one or more packets in the packet flow comprises invoking the flow function for a packet in the packet flow that caused the flow function to be generated.

10. The method of claim 1, wherein linking pre-compiled code fragments is performed according to a probability in response to performing the one or more actions for the packet flow.

11. A packet switching device comprising:
    an interface circuit for exchanging packets with a network;
    a processing circuit operatively connected to the interface circuit and configured to:
      determine one or more actions to be performed for a packet flow;
      link pre-compiled code fragments corresponding to at least two of the one or more actions to generate a flow function for the packet flow;
      replace symbols in the pre-compiled code fragments with values corresponding to the one or more actions;
      invoke the flow function for one or more packets in the packet flow.

12. The packet switching device of claim 11, wherein the processing circuit is configured to link pre-compiled code fragments in response to updating the one or more actions.

13. The packet switching device of claim 11:
    wherein the processing circuit is further configured to increment a flow counter each time the packet flow is executed; and
    wherein the processing circuit is configured to link pre-compiled code fragments in response to the flow counter reaching a threshold.

14. The packet switching device of claim 11:
    wherein the processing circuit is configured to link pre-compiled code fragments by linking pre-compiled code fragments corresponding to fewer than all of the actions; and
    wherein the processing circuit is further configured to invoke the actions not having corresponding pre-compiled code fragments for the one or more packets in the packet flow.

15. The packet switching device of claim 11, wherein the processing circuit is configured to link pre-compiled code fragments by linking fewer pre-compiled code fragments than actions that the pre-compiled code fragments corresponding to.

16. The packet switching device of claim 11, wherein the processing circuit is configured to determine one or more actions to be performed for the packet flow by referencing an entry in a flow table.

17. The packet switching device of claim 16, wherein the processing circuit is configured to link pre-compiled code fragments in response to the entry being added to the flow table.

18. The packet switching device of claim 16, wherein the processing circuit is further configured to link pre-compiled code fragments to generate a flow function for an entry of a second flow table.

19. The packet switching device of claim 11, wherein the processing circuit is configured to invoke the flow function for one or more packets in the packet flow by invoking the flow function for a packet in the packet flow that caused the processing circuit to generate the flow function.

20. The packet switching device of claim 11, wherein the processing circuit is configured to link pre-compiled code fragments according to a probability in response to performing the one or more actions for the packet flow.

* * * * *